United States Patent
Panciroli

(10) Patent No.: US 10,718,279 B2
(45) Date of Patent: Jul. 21, 2020

(54) METHOD FOR CONTROLLING AN INTERNAL COMBUSTION ENGINE

(71) Applicant: Magneti Marelli S.p.A., Corbetta (IT)

(72) Inventor: Marco Panciroli, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 1576 days.

(21) Appl. No.: 13/915,822

(22) Filed: Jun. 12, 2013

(65) Prior Publication Data

US 2013/0340709 A1 Dec. 26, 2013

(30) Foreign Application Priority Data

Jun. 12, 2012 (IT) .............................. BO2012A0323

(51) Int. Cl.
| | |
|---|---|
| F02D 41/00 | (2006.01) |
| F02P 5/04 | (2006.01) |
| F02D 17/02 | (2006.01) |
| F02P 5/15 | (2006.01) |
| F02P 5/00 | (2006.01) |
| F02D 41/12 | (2006.01) |
| F02D 13/06 | (2006.01) |

(52) U.S. Cl.
CPC ......... *F02D 41/00* (2013.01); *F02D 41/0007* (2013.01); *F02D 41/0087* (2013.01); *F02D 13/06* (2013.01); *F02D 17/02* (2013.01); *F02D 17/023* (2013.01); *F02D 41/123* (2013.01); *F02P 5/00* (2013.01); *F02P 5/04* (2013.01); *F02P 5/15* (2013.01); *Y02T 10/144* (2013.01)

(58) Field of Classification Search
CPC .... F02D 41/0087; F02D 17/02; F02D 17/023; F02D 17/026; F02D 13/06; F02D 41/123; F02P 5/00; F02P 5/04; F02P 5/15

USPC ................... 123/481, 406.12, 395
See application file for complete search history.

(56) References Cited

U.S. PATENT DOCUMENTS

| | | | | | |
|---|---|---|---|---|---|
| 4,296,605 | A | * | 10/1981 | Price | F01L 13/06 60/599 |
| 5,992,385 | A | * | 11/1999 | Hess | F02P 5/152 123/406.23 |
| 6,772,727 | B2 | * | 8/2004 | Kim | F02D 17/02 123/198 F |
| 7,044,101 | B1 | * | 5/2006 | Duty | F02D 17/02 123/198 F |
| 7,743,747 | B2 | * | 6/2010 | Lewis | F01L 1/38 123/198 F |

(Continued)

FOREIGN PATENT DOCUMENTS

| | | |
|---|---|---|
| DE | 102005010673 A1 | 9/2006 |
| EP | 2096277 A1 | 9/2009 |
| GB | 2115873 A | 9/1983 |

*Primary Examiner* — Mahmoud Gimie
*Assistant Examiner* — Joshua Campbell
(74) *Attorney, Agent, or Firm* — Howard & Howard Attorneys PLLC

(57) ABSTRACT

A method for controlling an internal combustion engine, comprising a number of cylinders and wherein the air mass trapped inside each cylinder is adjusted by means of a respective intake valve; the control method includes determining the total target torque; determining a target number of active cylinders; determining a target supercharge pressure such to guarantee the total target torque and controlling the intake valves of the target number of active cylinders (3) according to the target supercharge pressure such as to guarantee the total target torque.

6 Claims, 4 Drawing Sheets

(56) References Cited

U.S. PATENT DOCUMENTS

Figure 1:
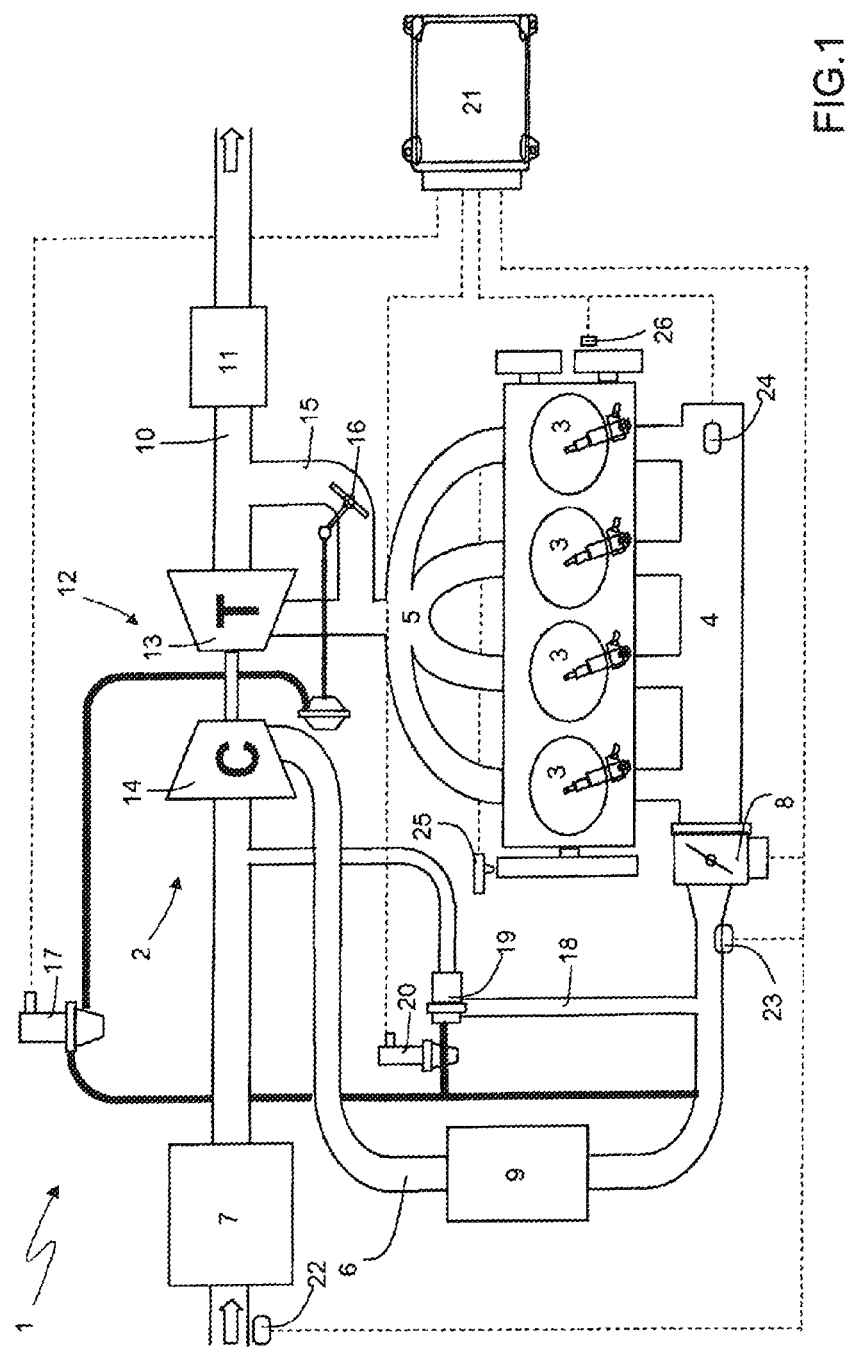

| | | | | |
|---|---|---|---|---|
| 7,757,666 B2* | 7/2010 | Whitney | ............... | F02D 37/02 |
| | | | | 123/198 DB |
| 2002/0179048 A1* | 12/2002 | Okamoto | ............ | F02D 41/0087 |
| | | | | 123/350 |
| 2003/0116129 A1* | 6/2003 | Franke | ................ | F02D 17/00 |
| | | | | 123/406.29 |
| 2003/0131820 A1* | 7/2003 | Mckay | ............... | F01L 13/0005 |
| | | | | 123/198 F |
| 2009/0044532 A1* | 2/2009 | Wu | ..................... | F02B 33/34 |
| | | | | 60/608 |
| 2009/0248277 A1* | 10/2009 | Shinagawa | ........ | F02D 13/0238 |
| | | | | 701/103 |
| 2010/0012072 A1* | 1/2010 | Leone | ................ | F02D 41/0087 |
| | | | | 123/192.1 |
| 2010/0108032 A1* | 5/2010 | Pursifull | ............ | B60W 10/06 |
| | | | | 123/406.12 |
| 2010/0269785 A1* | 10/2010 | Tanaka | ................ | F02D 37/02 |
| | | | | 123/348 |
| 2011/0197853 A1* | 8/2011 | Takeishi | ............... | B60H 1/08 |
| | | | | 123/406.45 |
| 2012/0029787 A1 | 2/2012 | Whitney et al. | | |
| 2014/0366842 A1* | 12/2014 | Tanaka | ................ | F02D 35/027 |
| | | | | 123/435 |

* cited by examiner

METHOD FOR CONTROLLING AN INTERNAL COMBUSTION ENGINE

CROSS-REFERENCE TO RELATED APPLICATION

This application is based upon and claims priority to Italian Patent Application BO2012A 000323 filed on Jun. 12, 2012.

BACKGROUND OF INVENTION

1. Field of Invention

The present invention relates to a method for controlling an internal combustion engine, in particular a supercharged engine.

2. Description of Related Art

As known, some internal combustion engines are provided with a turbocharger supercharging system, which can increase the power developed by the engine by exploiting exhaust gas enthalpy for compressing the air aspirated by the engine, and thus increasing volumetric intake efficiency.

A turbocharger supercharging system comprises a turbocharger provided with a turbine, which is arranged along an exhaust pipe to turn at a high speed under the bias of the exhaust gases expelled by the engine, and with a compressor, which is turned by the turbine and is arranged along the air feeding pipe to compress the air aspirated by the engine.

A rather evident turbo lag usually occurs when a considerable, sudden, rapid increase of torque or power is requested in low torque or power conditions (low rpm and slow speed, i.e. when the driver floors the accelerator pedal, e.g. for overtaking). Turbo lag is the tendency of engines with turbocharger of failing to respond with power to the fast pressing of the accelerator pedal, and is particularly annoying in the case of sports car applications, in which the turbocharger supercharging system allows to achieve high performance.

Turbo lag is mainly caused by the inertia moment of the rotor, and occurs in case of sudden, rapid request for more torque or power and because the pressure must increase in the overall volume of the circuit downstream of the compressor.

Various solutions have been suggested over the years to attempt to reduce turbo lag and to further improve the performance of engines provided with turbocharger. For instance, a variable geometry turbocharger or a turbocharger comprising a plurality of turbines in serial or parallel configuration etc. may be used. All the solutions known until now are in all cases particularly disadvantageous in terms of costs and overall dimensions.

It is the object of the present invention to provide a method for controlling an internal combustion engine, in particular supercharged by means of a turbocharger, which control method is easy and cost-effective to implement.

SUMMARY OF INVENTION

The invention overcomes the disadvantages in the related art in a method for controlling an internal combustion engine, in particular supercharged by means of a turbocharger provided with a turbine and with a compressor.

Objects, features, and advantages of the invention are readily appreciated as the invention becomes better understood while a subsequent detailed description of embodiments of the invention is read taken in conjunction with the accompanying drawing thereof.

BRIEF DESCRIPTION OF EACH FIGURE OF DRAWING OF INVENTION

Figure 2:
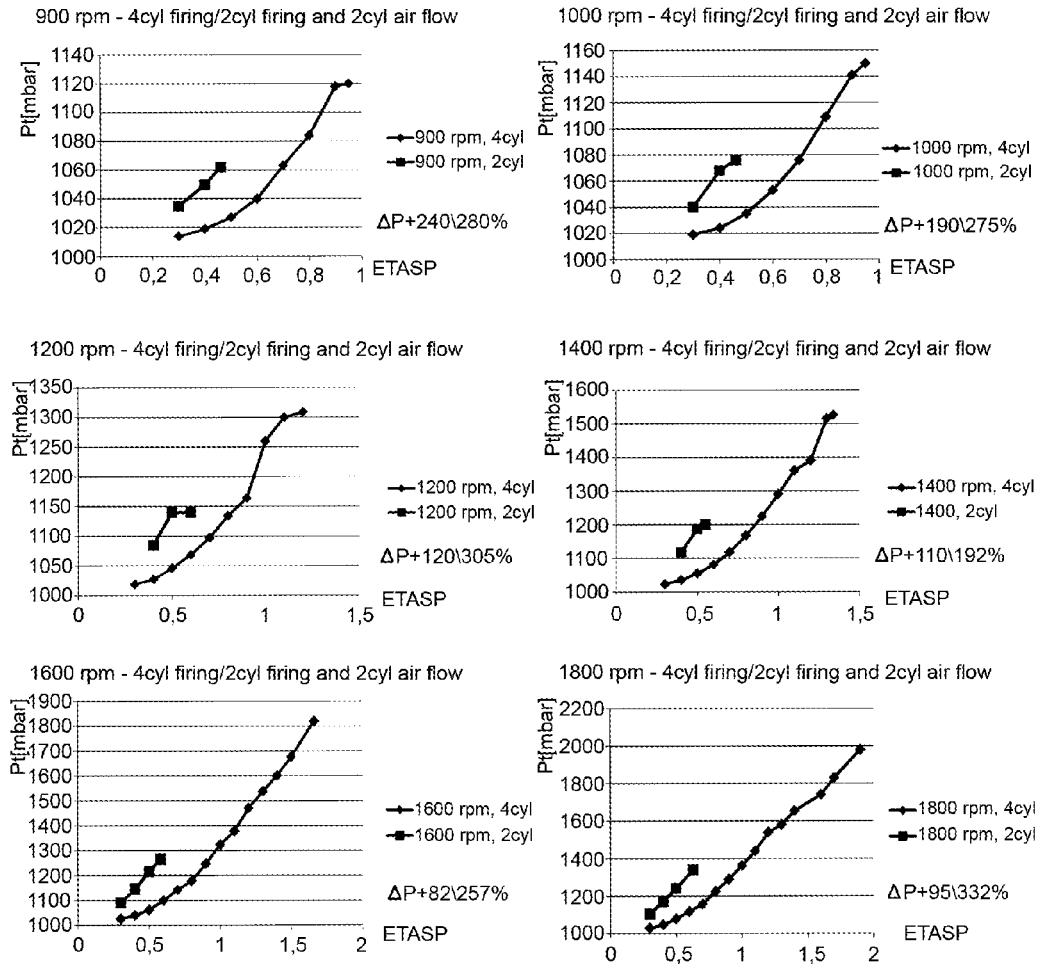
Figure 3:
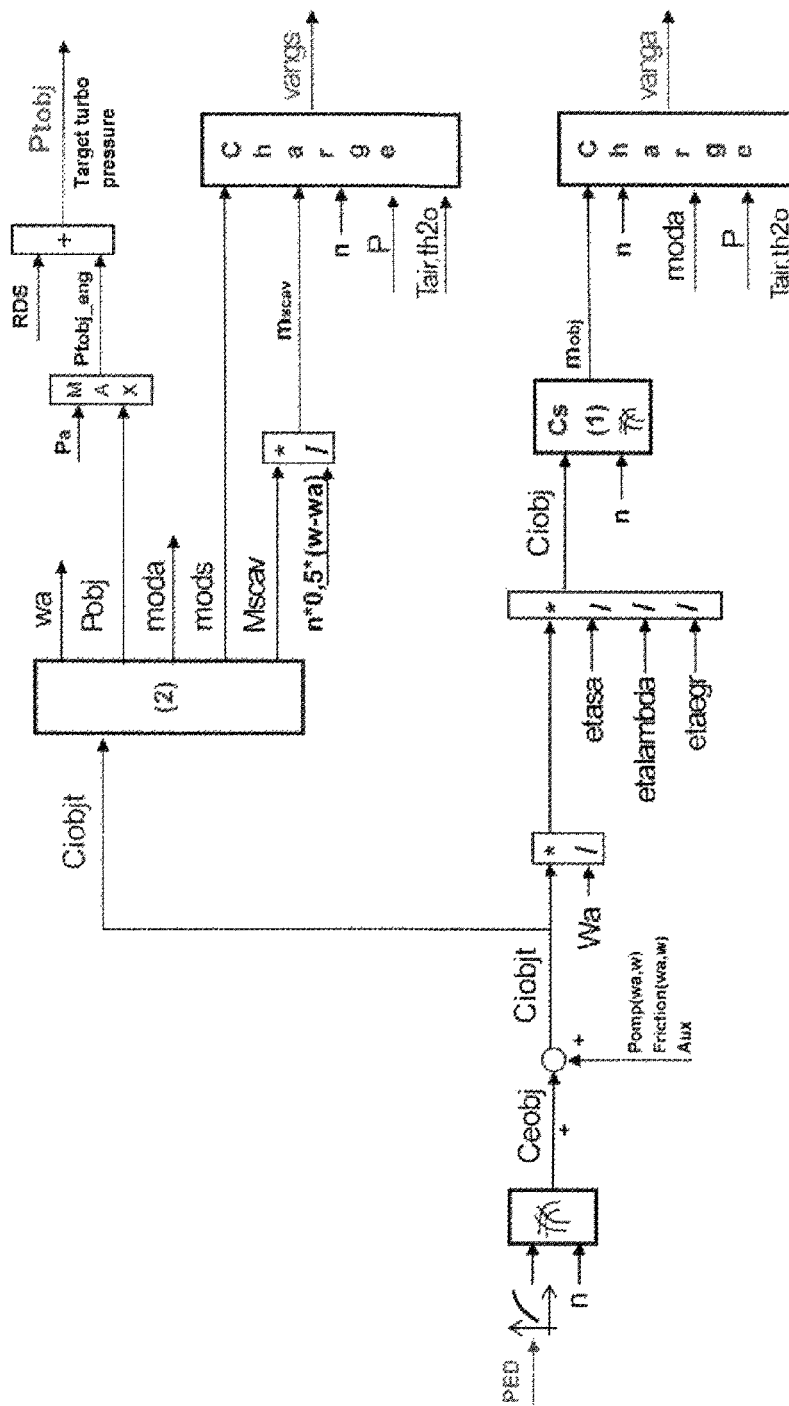
Figure 4:
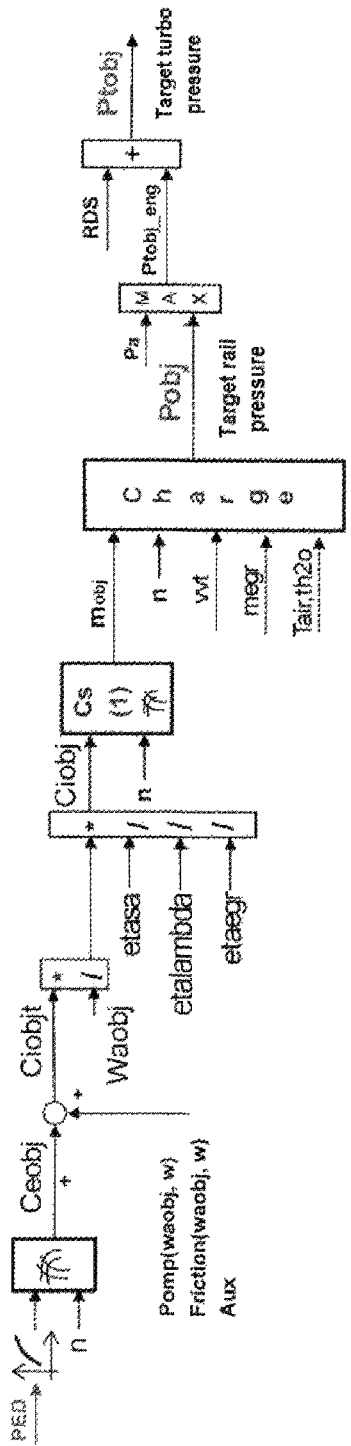

FIG. 1 diagrammatically illustrates an embodiment of an internal combustion engine supercharged by means of a turbocharger and provided with an electronic control unit which implements a control method according to the present invention;

FIG. 2 shows the comparison of the performance of the internal combustion engine supercharged by means of a turbocharger in a first normal configuration and in a second configuration achieved according to the present invention on a characteristic engine rpm/ETASP plane at various ratios;

FIG. 3 is a block chart which diagrammatically shows the operation of the control method according to the present invention in a supercharged internal combustion engine provided with intake valves controlled according to a variable lift law; and FIG. 4 is a block chart which diagrammatically shows the operation of the control method according to the present invention in a supercharged internal combustion engine provided with intake valves controlled according to a fixed lift law.

DETAILED DESCRIPTION OF EMBODIMENTS OF INVENTION

FIG. 1, numeral 1 indicates as a whole an internal combustion engine supercharged by a turbocharger supercharging system 2.

The internal combustion engine 1 comprises four cylinders 3, each of which is connected to an intake manifold 4 by means of at least one respective intake valve (not shown) and to an exhaust manifold 5 by means of at least one respective exhaust valve (not shown). The intake manifold 4 receives fresh air (i.e. air coming from the external environment) through an intake pipe 6, which is provided with an air cleaner 7 and is adjusted by a throttle 8. An intercooler 9 for cooling the intake air is arranged along the suction pipe 6. An exhaust pipe 10, which feeds the exhaust gases produced by combustion to an exhaust system, is connected to the exhaust manifold 5, which exhaust pipe emits the gases produced by the combustion into the atmosphere and normally comprises at least one catalyzer 11 and at least one silencer (not shown) arranged downstream of the catalyzer 11.

The supercharging system 2 of the internal combustion engine 1 comprises a turbocharger 12 provided with a turbine 13, which is arranged along the exhaust pipe 10 to turn at high speed under the bias of the exhaust gases expelled from the cylinders 3, and a compressor 14, which is arranged along the intake pipe 6 and is mechanically connected to the turbine 13 in order to be rotatably fed by the turbine 13 itself and increase the pressure of the air fed into the intake pipe 6.

A bypass pipe 15 is arranged along the exhaust pipe 10 and is connected in parallel to the turbine 13 so that its ends are connected upstream and downstream of the turbine 13 itself. A wastegate valve 16 is arranged along the bypass pipe 15, is adapted to adjust the exhaust gas flow flowing through the bypass pipe 15 and is driven by an actuator 17. A bypass pipe 18 is arranged along the exhaust pipe 6 and is connected in parallel to the compressor 14 so that its ends are connected upstream and downstream of the compressor 14 itself. A Poff valve 19 is arranged along the bypass pipe 18, adapted to adjust the exhaust gas flow flowing through the bypass pipe 18 and driven by an actuator 20.

Explicit reference will be made to an internal combustion engine 1 supercharged by means of a turbocharger 12 in the description that follows. Alternatively, the control method described above may be advantageously applied to any internal combustion engine, supercharged by means of a dynamic or volumetric compressor, for instance.

According to a first variant, the internal combustion engine 1 is provided with an electric machine mechanically connected to the turbocharger 12 and set up to recover exhaust gas energy; in this variant, it is possible both to deliver the necessary torque by consuming electricity and to brake by delivering electricity.

Alternatively, the control method described above can be applied to a supercharged internal combustion engine of the type described in patent application EP-A1-2096277, which comprises a turbine, a compressor mechanically independent from the turbine, an electric generator rotatably fed by the turbine for generally electricity and an electric motor which rotatably feeds the compressor.

In general, the embodiments described above have in common the fact that there is an air volume between the compressor 14 and the cylinders 3. The mass of air entrapped in each cylinder 3 for each engine cycle may be regulated by means of a respective intake valve (not shown) by means of a valve actuation device with a variable opening law, such as an electromagnetic or electrohydraulic camless actuation device. Alternatively, the mass of air entrapped in each cylinder 3 for each engine cycle is regulated by means of the interposition of a valve 27, in an embodiment, a throttle, between the compressor 14 and the intake valves. As a possible further alternative, a valve actuation device with variable opening law may be provided and a valve 27, in an embodiment, a throttle, may be inserted between the compressor 14 and the intake valves.

The internal combustion engine 1 is controlled by an electronic control unit 21, which governs the operation of all the components of the internal combustion engine 1, including the supercharging system 2. In particular, the electronic control unit 21 drives the actuators 17 and 20 of the wastegate valve 16 and of the Poff valve 19. The electronic control unit 21 is connected to sensors 22, which measure the temperature $T_0$ and the pressure $P_0$ along the intake pipe 6 upstream of the compressor 14, to sensors 23, which measure the temperature and pressure along the intake pipe 6 upstream of the throttle 8, and to sensors 24, which measure the temperature and pressure inside the intake manifold 4. Furthermore, the electronic control unit 21 is connected to a sensor 25, which measures the angular position (and thus the rotation speed) of a crankshaft of the internal combustion engine 1, and to a sensor 26, which measures the timing of the intake and/or exhaust valves. It is similarly worth noting that no sensors adapted to measure the rotation speed of the turbocharger 12 are needed.

The strategy implemented by the electronic control unit 21 to control the supercharged internal combustion engine 1 will be described below. In particular, the electronic control unit 21 is set to increase the mass and volumetric flow of air/and of exhaust gas which cross the compressor 14 and the turbine 13, with respect to the air flow actually used by the supercharged internal combustion engine 1 in combustion to generate the desired power. In order to implement the aforesaid control strategy, the electronic control unit 21 is set up to differentiate cylinder management 3, in particular to differentiate the intake air flow and the air trapped inside each cylinder 3, and to differentiate the operating mode.

In other words, the strategy includes generating the target torque required by the vehicle driver using only some of the firing cylinders 3, while the remaining cylinders 3 aspirate as much air as possible. For example, in a supercharged internal combustion 1 with four cylinders 3, two cylinders 3 are active and deliver the required torque by aspirating an air mass which is approximately double the one of the air mass which they would aspirate in normal operating conditions (i.e. if all four cylinders 3 were active). The remaining two cylinders 3 are not active and are controlled to aspirate the maximum air but are not involved in combustion.

The performance of the internal combustion engine 1 in two different configurations was empirically determined on a test bench for a supercharged internal combustion engine 1 provided with four cylinders 3 (in third gear), in which in a first configuration there are four active firing cylinders 3 (hereinafter named "normal configuration") and in which in a second configuration there are two active firing cylinders 3 and two cylinders 3 which aspirate but which are not involved in injection or combustion (hereinafter named "scavenging configuration").

As shown in FIG. 2, at various ratios, an increase of supercharging up to 210 mbar can be observed in scavenging configuration on the characteristic rpm/ETASP plane, wherein engine rpm is from 900 to 1800 rpm and ETASP is the intake efficiency, defined by the ratio between the air trapped in each cylinder 3 for each cycle and the air mass which fills the displacement in the normal configuration. A 210 mbar increase of supercharging is equal to approximately two/three times the supercharging which can be obtained in normal configuration. In scavenging configuration, ETASP intake efficiency, defined by the trapped air mass for each cycle and for each cylinder 3 and the air mass which fills the displacement in normal configuration, is an average value on the four cylinders 3, i.e. is approximately half the one in the active cylinders 3.

Assuming the condition of a supercharging internal combustion engine 1 at constant rpm (e.g. 3000 rpm) the supercharged internal combustion engine 1 in normal configuration with the four active firing cylinders 3 aspirates a mass air flow Mc which allows to deliver a power Pc, with a supercharge pressure p_c and a torque Cc transmitted to the drive wheels. The operating point c in normal configuration is identified on the plane which represents the characteristic curves of the turbocharger 14 (usually supplied by the manufacturer of the turbocharger 12) for a given revolution speed Nc, to which a predetermined position of the wastegate valve WGc 16 corresponds.

It has been found that the supercharged internal combustion engine 1 in scavenging configuration with two active firing cylinders 3 aspirates a mass air flow Ma and allows to achieve a supercharge pressure p_a and, at the same time, deliver the same power Pc and the same torque Cc transmitted to the drive wheels as normal configuration, to which a predetermined position of the wastegate valve WGa 16 corresponds.

In particular, the mass air flow Ma of the scavenging configuration is higher than the mass air flow Mc of the normal configuration, and the wastegate valve 16 is more closed than in normal configuration (in other words, WGa<WGc.

In the variant in which the mass air flow Ma of the scavenging configuration is approximately double the mass flow rate Mc of the normal configuration, it has been found that a supercharge pressure p_a in scavenging configuration which is approximately double the supercharge pressure p_c of normal configuration can be obtained. It is worth noting that this increase of supercharge pressure may be reached by delivering the same power Pc and transmitting the same torque Cc to the drive wheels as the normal configuration.

In use, in the moment in which, when requested by the driver, the torque Cc delivered to the drive wheels must be increased, the electronic control unit 21 is set up to control the switch from scavenging operating mode to normal operating mode. In other words, all four cylinders 3 become active, fire, can immediately deliver the already available power corresponding to the air flow rate Ma and transmit the required torque to the drive wheels. In this manner, it is possible to reduce in considerable manner the response time of the turbocharger 12 (the so-called turbo lag) because the air circuit of the supercharged internal combustion engine 1 is already pressurized and the turbocharger 12 is already at full rate (in other words, the inertia and pressurization time of the entire supercharging circuit are nearly cancelled out).

As known, the active zone of the operating range of the compressor 14 is limited, on the left part of the reduced mass flow rate/compression ratio plane, by a pumping line which delimits the forbidden zone and consists of the sets of points in which the aerodynamic balance in the compressor 14 is interrupted and there is a periodical, noisy and violent rejection of flow rate to the mouth, the effects of which may be destructive for the blades of the compressor 14 itself.

Also near the pumping line and assuming the condition of a supercharging internal combustion engine 1 at constant rpm (e.g. 3000 rpm) in normal configuration, it is possible to determine that the four active firing cylinders 3 aspirate a mass air flow Mc which allows to deliver a power Pc, with a supercharge pressure p_c and a torque Cc transmitted to the drive wheels. The operating point c in normal configuration is identified on the pumping line on the plane which represents the characteristic curves of the turbocharger 14 (usually supplied by the manufacturer of the turbocharger 12) for a given rpm Nc, to which a predetermined position of the wastegate valve WGc 16 corresponds.

It has been found that the supercharged internal combustion engine 1 in scavenging configuration with only two cylinders 3 active and firing aspirates a mass air flow Ma and allows to reach a supercharge pressure p_a and, at the same time, allows to deliver the same power Pc and the same torque Cc transmitted to the drive wheels as in normal configuration. In particular, it has been found that the mass flow rate Ma in scavenging configuration is higher than the mass flow rate Mc in normal configuration.

It is immediately apparent that also in this case, a supercharge pressure p_a in scavenging configuration higher than the supercharge pressure p_c in normal configuration can obtained without the occurrence of pumping. It is worth noting that this increase of supercharge pressure may be achieved by delivering the same power Pc and transmitting the same torque Cc to the drive wheels as normal configuration.

A supercharged internal combustion engine 1 of the type described above comprises a number W of cylinders 3, wherein Wa are the active cylinders 3 which by firing generate the required torque, while Ws indicates the remaining cylinders 3 which do not generate the required torque by firing and are actuated only to aspirate a mass air flow.

According to a preferred variant, both the number W of cylinders 3 and the number Wa of active cylinders 3 are even and appropriately timed to limit the oscillations which are transmitted to the drive shaft.

The chain which from the torque request to the device which acts on the accelerator pedal can provide the combustion air mass of each cylinder 3 is shown in FIG. 3 and may be diagrammatically illustrated as follows:

a) the user acts on the accelerator pedal and the torque Ceobj required from the drive shaft can be determined by means of maps stored in the electronic control unit 21 and of rpm;

b) the torque Ceobj required from the drive shaft is added to the friction, pumping and auxiliary torques so as to obtain the total actual torque Ciobjt required from the drive shaft;

c) the actual torque Ciobj' for each active cylinder 3 is thus calculated by the ratio between the actual total torque Ciobjt required from the drive shaft and the number Wa of active firing cylinders 3;

d) the actual torque Ciobj' for each active cylinder 3 is divided by the EGR efficiency etaegr (if present), by the mixture efficiency etalambda and by the spark advance efficiency etasa, thus providing the reference actual torque Ciobj for each active cylinder 3; and e) from the reference actual torque Ciobj for each active cylinder 3 it is possible to determine the combustion air mass mobj for each active cylinder 3.

In particular, in step e), the firing air mass mobj for each active cylinder 3 is calculated by the consumption of air of the engine Csrif(Ciobj,n) in reference conditions (i.e. with a stoichiometric mixture A/F stech and optimal advance), for each cylinder 3, as follows:

$$Cs = mc/Lu \quad [1]$$
$$= mc/(Cmi*4\pi)$$
$$= m/(A/F)stech*Cmi*4\pi$$

wherein:
Cs: specific consumption;
Lu: mechanical work for each cycle and for each cylinder 3;
mc: fuel mass for each cycle and for each cylinder 3;
m: air mass for each cycle and for each cylinder 3; and
Cmi: indicative positive torque for each cylinder 3.

The following can be obtained from equation [1]:

$$m = Cs(Cmi,n)*(A/F)stech*Cmi*4\pi$$

i.e. it is possible to directly map the air consumption of the cylinder 3 as a function of the actual torque Cmi for the cylinder 3 and of the engine speed n:

$$m = f3(Cmi,n) = Csrif(Cmi,n)$$

Where f3 or Csrif are the functions by means of which determining the fuel air mass mobj for each active cylinder 3 which must be burnt together with the fuel mass mc in stoichiometric ratio conditions and optimal advance to obtain the reference actual torque Ciobj required for each active cylinder 3 (with EGR zero, i.e. with unitary EGR efficiency).

Similarly, it is possible to determine the actual drive torque Ciobj for each active cylinder 3 as a function of a combustion air mass mobj for each active cylinder 3 as follows:

$$Ciobj = g(mobj,n)$$

Where g is the function by means of which determining the reference actual torque Ciobj for each active cylinder 3 in stoichiometric ratio conditions, optimal advance and with unitary EGR efficiency, burning the firing air mass mobj for each active cylinder 3 together with the combustion mass mc.

In general conditions in step b), the torque Ceobj required from the drive shaft is added to the friction, pumping and auxiliary torques so as to obtain the total actual torque Ciobjt required from the drive shaft as follows:

$$Ciobjt = Ceobj + \text{friction}$$
$$= g(mobj, n) * etalambda(\text{lambda}) * etasa(sa\_ottimo - sa) *$$
$$etaegr * wa$$

Wherein, friction is the sum of the mechanical, pumping losses and auxiliary friction torques, and wherein etasa is the combustion efficiency relative to the actuated spark advance (i.e. as a function of the deviation with respect to the optimal advance which is stored in specific maps in the electronic control unit 21), while etalambda is the efficiency as a function of the mixture, and etaegr is the efficiency as a function of the EGR mass.

According to a variant, it is possible to determine the reference actual torque Ciobj for each active cylinder 3 as a function of a combustion air mass mobj for each active cylinder 3 as follows:

$$Ciobj = k(n) * mobj + \text{offset}(n).$$

According to a first variant, the supercharged internal combustion engine 1 comprises intake valves which are controlled by the electronic control unit 21 independently for each cylinder 3 with variable lift. For example, each valve is provided with an electrohydraulic actuator, or alternatively with an electromagnetic actuator for controlling closing and/or lift.

A map is stored in the electronic control unit 21 as a function of the engine point which is identified by the rpm and by the load. For each engine point, the map provides the number Wa of active cylinders 3, the actuating methods of the solenoid valve (typically to be chosen between late LO opening, early EC closing etc.) and the relative pressure in the common rail 5.

The cylinders 3 which are not active and which do not fire may instead be used to aspirate an air mass which, as previously described, may allow to improve performance in terms of supercharging of the internal combustion engine 1. Also in this case, a map is stored in the electronic control unit 21 as a function of the engine point which is identified by the rpm and the load. For each engine point, the map provides the target scavenge mass which represents the quantity of air which optimizes the performance of the supercharged internal combustion engine 1.

The chain which from the torque request from the users acting on the accelerator pedal can provide the target scavenge mass Mscav of each cylinder 3 is shown in FIG. 3 and may be diagrammatically illustrated as follows:

- the user acts on the accelerator pedal and the total actual torque Ciobjt required from the drive shaft (obtained from the torque Ceobj required from the drive shaft added to the friction, pumping and auxiliary torques) can be determined by means of the maps stored in the electronic control unit 21;
- the total actual torque Ciobjt required from the drive shaft allows to determine, by means of the engine rpm and the previously defined map, the target pressure value Pobj upstream of the intake valve, which (saturated by the atmospheric pressure Pa) provides the target supercharge pressure Ptobj_eng. The target supercharge pressure value Ptobj_eng is added to such a supercharge reserve RDS which allows to optimize the performance of the internal combustion engine 1. Explicit reference is made to the description of patent application BO2011A000400 for a better understanding of the control strategy of a supercharged internal combustion engine by means of a supercharge reserve. The minimum target supercharge pressure value Ptobj_eng, which is added to a supercharge reserve RDS, thus allows to determine the target supercharge pressure value Ptobj;
- from the total actual torque Ciobjt requested from the drive shaft the number of active cylinders Wa, the actuating method of the solenoid valves (typically to be chosen from late LO opening, early EC closing etc.), the actuating method of the inactive cylinders and the target scavenge mass Mscav can be determined (using maps and rpm) as described above;
- finally, the target scavenge mass mscav for each of the inactive cylinders 3 can be obtained from the target scavenge mass Mscav.

The actual torque Ciobj' for each active cylinder 3 is determined by the ratio between the total actual torque Ciobjt required from the drive shaft and the number Wa of active cylinders determined by the aforesaid maps also as a function of the engine ratio rpm. Such actual torque Ciobj' for each active cylinder 3 is divided by EGR efficiency (if present), the mixture etalambda efficiency and the spark advance etasa efficiency and provides the reference actual torque Ciobj, which by means of the specific consumption map Csrif (or f3) determines the target air mass mobj for each active cylinder 3. The target scavenge mass mscav for each of the inactive cylinders 3 may be simply obtained from the ratio between the target scavenge mass Mscav and the value which corresponds to the number of inactive cylinders 3 (i.e. the total number of cylinders, minus the number Wa of active cylinders) multiplied by the number of revolutions (rpm), multiplied by 0.5.

Finally, two filling models (of the speed density type, for instance) are stored in the electronic control unit 21 by means of which the angle to be actuated for the solenoid valve which control the number of active cylinders Wa and the remaining inactive cylinders, respectively, can be determined.

In particular, a first filling module is made to determine the angle Vanga for controlling the solenoid valves arranged at the active cylinders. The filling module includes a plurality of input data, including: the combustion air mass mobj for each active cylinder 3, the rpm, the actuating method of the solenoid valves (typically, to be chosen between late LO opening, early EC closing etc.), the pressure value P upstream of the intake valve in the common rail 5, and other surrounding conditions (such as, for example, the air temperature in the common rail 5 and the temperature of the coolant used in the supercharged internal combustion engine 1).

A second filling model is made to determine the angle Vangs for controlling the solenoid valves arranged at the active cylinders. The filling module includes a plurality of input data, including: the target scavenge mass mscav for each inactive cylinder 3, the rpm, the actuating method of the solenoid valves of the inactive cylinders 3, the pressure value P upstream of the intake valve in the common rail 5, and other surrounding conditions (such as, for example, the air temperature in the common rail 5 and the temperature of the coolant used in the supercharged internal combustion engine 1).

According to a preferred variant, in order to determine the frictions and the pumping work, the number Wa of active cylinders 3 and the number of inactive cylinders 3 is taken into account.

It is apparent that the control strategy described above must be adapted to the operating conditions in transient ratios (or to operating conditions other than standard or stationary operating conditions).

In particular, during the transient step, the method includes determining at each predetermined step of calculating the actual potential torque which is calculated as follows:

$$Ce\_pot\_temp = g(mamax,n) * etasa * etalambda * etaegr * wtemp - friction(wtemp,w)$$

Wherein:

Ce_pot_temp: actual potential torque which corresponds to the torque which can be achieved with the maximum air that can be trapped in the cylinder at the current pressure and temperature;

n: rpm;

mamax: maximum quantity of air which can be trapped in the cylinder 3;

g: is the function by means of which the reference actual torque Ciobj is determined for each active cylinder 3 in stoichiometric ratio, optimal advance and with unitary EGR efficiency, burning the combustion air mass mamax for each active cylinder 3 together with the fuel mass mc;

friction: sum of the mechanical frictions and the pumping losses;

wtemp: the current number of firing cylinders 3, i.e. the current number of active cylinders 3.

In an initial condition:

$$Wtemp = Warif$$

wherein:

Wtemp: temporary number of firing cylinders 3, i.e. temporary number of active cylinders; and Warif: reference number of cylinders 3 determined as a function of the engine point.

The electronic control unit 21 then checks the condition:

$$Ceobj \leq Ce\_pot\_temp$$

Wherein:

Ce_pot_temp: potential actual torque; and
Ceobj: the torque required from the drive shaft.
If the aforesaid condition occurs, then:

$$Wa = Wtemp = Warif$$

wherein Wtemp and Warif have the meaning introduced above with regards to the equation and Wa is the number of active controlled, and thus current, cylinders 3.

If the aforesaid condition does not occur (i.e. the torque Ceobj required from the drive shaft is higher than the actual potential torque Ce_pot_temp), then the current number of firing cylinders 3 is increased, i.e. the current number of active cylinders 3. In other terms:

$$Wtemp = Wtemp + \Delta$$

wherein $\Delta$ is the number of additional active cylinders 3 which fire.

Also in this case, according to an embodiment, the number $\Delta$ of additional cylinders 3 is even, in an embodiment, equal to 2, and appropriately timed to limit the oscillations which are transmitted to the drive shaft.

Once that the current number of firing cylinders 3, i.e. the current number of active cylinders 3, has been increased, the Ceobj≤Ce_pot_temp condition is checked again and the process is stopped only when such a condition is true, or when the current number Wa of firing cylinders 3, i.e. the number of current active controlled cylinders Wa, is equal to the number W of cylinders 3.

By means of the methods described above, it is possible to converge to the situation in which the number Wa of active cylinders 3 allows to optimize the performance of the supercharged internal combustion engine 1, i.e. to converge to Warif. If in transient ratio or in non-standard conditions, the number Warif of active reference cylinders 3 should not be sufficient to generate the torque required by the driver, the electronic control unit 21 is in all cases ready to control the firing of some or all of the remaining cylinders 3 for an interval of time to allow to generate the required torque.

According to a possible variant, the equation introduced above for determining the actual potential request torque Ce_pot_temp is replaced by the equation wherein the efficiency etaegr is replaced by the maximum efficiency etaegrmax which allows to optimize the delivered torque. In particular:

$$Ce\_pot\_temp = g(mamax,n) * etasa * etalambda * etaegrmax * wtemp - friction(wtemp,w)$$

Wherein:

Ce_pot_temp: actual potential required torque, which corresponds to the maximum torque which can be required;

n: rpm;

mamax: maximum quantity of air which can be trapped in the cylinder 3 and which is calculated by means of the filling model above with the current pressure value and the current temperature value; and g: function by means of which determining the indicative positive torque Ciobj (reference) for each active cylinder 3 in stoichiometric ratio conditions, optimal advance and zero EGR, burning the combustion air mass mamax for each active cylinder 3 together with the fuel mass mc;

friction: sum of the mechanical frictions and the pumping losses;

Wtemp: the current number of firing cylinders 3, i.e. the current number of active cylinders.

According to this variant, it is possible to minimize the number Wa of active cylinders using the EGR efficiency formula which maximizes the delivered torque; this is possible if the EGR actuator is sufficiently fast.

According to a further embodiment, it is possible to use an equation, in which the efficiency etaegr is replaced with the maximum efficiency etaegrmax, which allows to optimize the delivery torque, and the efficiency etasa is replaced with the optimal advance etasamax, which allows to optimize efficiency with the object of reducing the number Wa of active cylinders 3.

In particular:

$$Ce\_pot\_temp = g(mamax,n) * etasamax * etalambde etaegrmax * wtemp - friction(wtemp,w).$$

According to a further embodiment, an equation can be used, in which the efficiency etaegr is replaced with the maximum efficiency etaegrmax, which allows to optimize the delivered torque, the advance etasa is replaced with the optimal advance etasamax, and the mixture etalambda is replaced with the mixture etalambdamax, which allows to optimize the delivered torque with the target of reducing the number Wa of active cylinders 3. In particular:

$$Ce\_pot\_temp = g(mamax,n) \cdot etasamax \cdot etalambdamax \cdot etaegrmax \cdot wtemp\text{-}friction(wtemp,w).$$

Furthermore, it is worth noting that during a transient step, the target scavenge mass Mscav, which represents the quantity of air which optimizes the performance of the internal combustion engine 1, may be appropriately increased (or decreased) with respect to a target reference scavenge mass Mscavrif defined as a function of the engine point of the electronic control unit 21.

For example, the target scavenge mass Mscav is calculated as follows:

$$Mscav = Mscavrif(C,n) + \Delta(derivative(Ciobjt)).$$

Wherein:

Mscavrif (C,n): reference target scavenge mass, as a function of the engine operation point determined by the load and by the number of revolutions per minute; and Ciobjt: total actual torque required from the drive shaft.

According to a second variant, the supercharged internal combustion engine 1 comprises throttle intake valves, which are controlled by the electronic control unit 21 with fixed lift law and/or by a VVT (Variable Valve Timing) device, which hydraulically acts on the shaft which actuates the throttle intake valves by modifying the inclination thereof with respect to the drive shaft.

A map is stored as a function of the engine point which is identified by the rpm and the load (which, according to a total drive torque variant Ciobjt required from the drive shaft or by the intake efficiency ETASP) in the electronic control unit 21. For each engine point, the map provides the timing angle of the valves during intake stroke, the timing angle of the valves during the exhaust stroke and the external EGR mass.

Furthermore, a map is stored as a function of the engine point which is identified by the rpm and the load (which, according to a total drive torque variant Ciobjt required from the drive shaft or by the intake efficiency) in the electronic control unit 21. For each engine point, the map provides the number Warif of active reference cylinders 3. During a preliminary step, the target number Waobj of active cylinders 3 is equal to the number Warif of reference active cylinders 3. Furthermore, it is worth noting that it is not possible to control the target scavenge mass Mscav for each of the inactive cylinders 3.

A filling model is stored the electronic control unit 21 (e.g. of the speed density type) by means of which it is possible to determine the air mass trapped in each cylinder 3 at each cycle. In particular, the filling module includes a plurality of input data, including: rpm, timing angle of the valves during intake stroke, timing angle of the valves during exhaust stroke, the value of the pressure P upstream of the intake valve in the common rail 5 and other surrounding conditions (such as, for example, the temperature of the air in the common rail 5 and the temperature of the coolant used in the supercharged internal combustion engine 1).

According to a variant, in order to determine the friction and the pumping work, the number W of cylinders 3 and the target number Waobj of active cylinders 3 is taken into account.

It is apparent that the control strategy described above must be adapted to the transient ratio operating conditions (or to operating conditions other than standard or stationary operating conditions).

In particular, the method includes determining the actual torque at each predetermined calculation step as follows:

$$Ce = g(ma,n) \cdot etasa \cdot etalambda \cdot etaegr \cdot wtemp\text{-}friction(wtemp,w)$$

Wherein:

Ce: actual torque;

n: rpm;

ma: air mass trapped for each cylinder 3 at each cycle which is calculated by means of the filling model shown in the equation;

g: function by means of which to determine the indicative positive torque Ciobj (reference) for each active cylinder 3 in stoichiometric ratio conditions, optimal advance and zero EGR, burning the combustion air mass ma for each active cylinder 3 together with the fuel mass mc;

friction: sum of the mechanical frictions and the pumping losses; and wtemp: temporary number of firing cylinders 3, i.e. the current number of active cylinders.

In an initial condition the current number Wtemp of firing cylinders 3 is determined, i.e. the current number of active cylinders, equal to the reference number Warif of cylinders 3 determined as a function of the engine point.

The electronic control unit 21 thus proceeds by determining the advance efficiency etasa which would be needed to obtain the actual target torque with the temporary number Wtemp of firing cylinders 3. In order to determine the advance efficiency etasa which would be needed to obtain the actual target torque, the mass ma of air trapped in each cylinder 3 is maintained and calculated by means of the equation reference module, the EGR efficiency etaegr and the current mixture etalambda. During a preliminary step of setting up and tuning, the minimum and maximum values are established for the advance efficiency etasa, which are indicated using etasamin and etasama, respectively. If the advance efficiency etasa is comprised between the minimum and maximum values, indicated by etasamin and etasamax of the advance efficiency, respectively, then the number Wa of active cylinders 3 is equal to the temporary number Wtemp of firing cylinders 3, i.e. the temporary active number of cylinders, i.e. again to the number Warif of reference cylinders 3 determined as a function of the engine point.

If the aforesaid condition occurs, then Wa is set equal to Wtemp and to Warif, wherein Wtemp and Warif have the meaning illustrated above for the equation and Wa is the number of active controlled cylinders 3.

There are two situations if the aforesaid condition does not occur (i.e. if the advance efficiency etasa is not comprised between the minimum and the maximum values, indicated by etasamin and etasamax of the advance efficiency, respectively).

In the first case, the advance efficiency etasa is lower than the minimum advance efficiency value etasamin. In this case, the current number of firing cylinders 3 is decreased, i.e. the current number of active cylinders 3. I.e. Wtemp=Wtemp−Δ, wherein Δ is the number of active cylinders 3 which are subtracted from firing. At this point, the electronic control unit 21 thus proceeds by determining again the advance efficiency etasa which would be needed to obtain the actual target torque with the temporary number Wtemp of firing cylinders 3. The process stops when the advance efficiency etasa is comprised between the minimum and maximum advance values etasamin and etasamax. The number Wa of active cylinders 3 is equal to the temporary number Wtemp of active cylinders 3, i.e. the number Warif of reference cylinders 3 determined as a function of the engine point decreased by a number of active cylinders 3 which are subtracted from firing.

In the second case, the advance efficiency etasa is higher than the maximum advance efficiency value etasamax. In this case, the temporary number of firing cylinders 3 comes, i.e. the temporary number of active cylinders 3. I.e. Wtemp=Wtemp−Δ, wherein Δ is the number of active cylinders 3 which are added to firing. At this point, the electronic control unit 21 thus proceeds by determining again the advance efficiency etasa which would be needed to obtain the actual target torque with the temporary number Wtemp of firing cylinders 3. The process stops when the advance efficiency etasa is comprised between the minimum and maximum advance values etasamin and etasamax. The number Wa of active cylinders 3 is equal to the temporary number Wtemp of active cylinders 3, i.e. the number Warif of reference cylinders 3 determined as a function of the engine point increased by a number of active cylinders 3 which are added to combustion.

In the first case, the process is interrupted when the temporary number Wtemp of firing cylinders 3, i.e. the temporary number of active cylinders, is equal to a number Wmin of active cylinders 3 which is defined during an initial step of setting and tuning and is variable according to the engine point.

In the second case, the process obviously stops when the temporary number Wtemp of firing cylinders 3, i.e. the temporary number Wtemp of active cylinders is equal to the number W of cylinders 3.

Also in this case, according to a preferred variant, the number Δ of active cylinders 3 which are respectively either added to or subtracted from combustion is even, in an embodiment, equal to 2, and appropriately timed to limit the oscillations which are transmitted to the drive shaft.

By means of the method described above, it is possible to converge to the situation with the number Wa of active cylinders 3 which allows to optimize the performance of the supercharged internal combustion engine 1 and also to determine the necessary spark advance (by means of an inverse function of the advance efficiency etasa which is stored in the electronic control unit 21).

According to a possible alternative embodiment, the case may occur (particularly in stationary conditions) in which the spark advance SA is different, in particular smaller, than the reference spark advance, i.e. the optimal spark advance which allows to optimize consumptions. In other words, it may occur that SA<SAottimo, i.e. that the advance efficiency etasa is lower than the maximum advance efficiency value etasamax. In this case, the target number Waobj of cylinders 3 is set equal to the number Warif of reference active cylinders 3 determined as a function of the engine point increased by a number of active cylinders 3 which are added to firing only for a limited, predetermined interval of time. In this manner, it is possible to gradually increase the number Waobj of active cylinders 3 to reach the condition in which the spark advance SA is approximately equal to the optimal spark advance SAottimo and wherein the target number Waobj of active cylinders 3 is equal to the number Wa of active cylinders 3.

According to a further variant, it is possible to inject a quantity of fuel into the number Ws of inactive cylinders (3).

According to a further variant, it is possible to control the number Ws of inactive cylinders 3 for combustion but not for torque generation.

The two variants described above essentially allows to increase the exhaust temperature in order to approximately heat up the catalyst and/or to provide more power to the turbine 13 of the turbocharger 12 (in particular in the case of spark-ignited engines).

The case of a supercharged internal combustion engine 1 comprising any number of cylinders 3 was taken into account in the description above. In particular, the description above is advantageously, but not exclusively applied to an internal combustion engine 1, supercharged by means of a turbocharger 12 and provided with four cylinders 3 with a crankshaft offset by 180°, and wherein the firing sequence is 1-3-4-2 in sequence. In this case, active cylinders 3 are 1-4 or 3-2, or 1-3-4-2, respectively.

Furthermore, according to a possible variant (not shown), the internal combustion engine 1 is supercharged by means of a number of turbochargers 12. For example, in the case of an internal combustion engine 1 supercharged by means of two turbochargers 12, the electronic control unit 21 is set up to control as active cylinders 3 those which are connected to a first turbocharger 12; while the electronic control unit 21 is set up to control as inactive cylinders 3 not involved in combustion those which are connected to a second turbocharger 12.

The description above is advantageously, but not exclusively applied to a supercharged internal combustion engine 1. Indeed, the control method described above may be advantageously applied to an aspirated internal combustion engine 1.

A particular case occurs when the scavenge mass Mscav is zero, i.e. Mscav=0, or in the case of aspirated engine; in the latter case, if Pobj>Patm, then the number of firing cylinders 3 is increased in the chain by a determined value A to reach the condition in which Pobj≤Patm.

Furthermore, the strategy described above may be advantageously applied if implemented for controlling supercharged internal combustion engine by means of a supercharge reserve and is provided with a sporty style driving detector of the type described in Italian patent BO2012A000216.

The method described above has many advantages. In particular, despite being advantageous in terms of costs, easy and cost-effective to implement and not implying an excessive additional computing burden for the electronic control unit 21, it allows to reduce turbo lag and to optimize the performance of the engine with turbocharger 12

The invention has been described above in an illustrative manner. It is to be understood that the terminology that has been used above is intended to be in the nature of words of description rather than of limitation. Many modifications and variations of the invention are possible in light of the above teachings. Therefore, within the scope of the appended claims, the invention may be practiced other than as specifically described above.

What is claimed is:

1. A method for controlling an internal combustion engine (1) including a turbocharger (12) provided with a turbine (13) and with a compressor (14) and further comprising an intake manifold (4) which receives fresh air through an intake pipe (6) adjusted by a throttle (8) valve and a number (W) of cylinders (3) connected to the intake manifold (4) and wherein the air mass trapped in each cylinder (3) for each engine cycle is adjusted by a respective throttle intake valve, wherein throttle intake valves are controlled independently for each cylinder (3); the control method comprising steps of:
   determining the total target torque ($C_{i\_objt}$) required to be delivered for the operation of the internal combustion engine (1);

determining a target number (Waobj) of active cylinders (3) to be controlled for injection and combustion, wherein the target number (Ws) of active cylinders (3) is any number from 0 to the number (W) of cylinders (3);

determining a number (Ws) of inactive cylinders (3) which are controlled to intake the most air as possible by controlling the respective throttle intake valve and are determined as a function of the target number (Waobj) of active cylinders (3) to be controlled for injection and combustion;

determining a target pressure (Pobj) of the intake manifold that is such as to guarantee the total target torque (Ci_objt) required to be delivered for the operation of the internal combustion engine (1); and controlling the throttle (8) valve to adjust the target intake manifold pressure (Pobj) so as to guarantee the target torque (Ci_objt) required to be delivered for the operation of the internal combustion engine (1) by the target number (Waobj) of active cylinders (3) to be controlled for injection and combustion;

the step of determining the target number of cylinders (3) to be controlled for injection and combustion, wherein the target number (Waobj) of active cylinders (3) is any number comprised between 0 and the number (W) of cylinders (3), comprises sub-steps of:

determining a temporary number (Watemp) of active cylinders (3) to be controlled for injection and combustion as a function of the engine point;

determining, during a preliminary step of setting up and tuning, a possible minimum and maximum spark advance efficiency value for achieving combustion, wherein the spark advance efficiency (etasa) is the combustion efficiency relative to the actuated spark advance, as a function of the deviation with respect to the optimal advance which is stored in specific maps in an electronic control unit (21);

determining a necessary spark advance efficiency which should be actuated by the temporary number (Watemp) of active cylinders (3) in order to guarantee the total target torque (Ci_objt) required to be delivered for the operation of the internal combustion engine (1);

comparing the necessary spark advance efficiency with the possible minimum and maximum spark advance efficiency value for combustion; and updating the target number (Waobj) of active cylinders (3) as follows:
(a) causing the target number (Waobj) of active cylinders (3) to be equal to the temporary number (Watemp) of active cylinders (3) only when the necessary spark advance efficiency is comprised within the range defined by the possible minimum and maximum spark advance efficiency value; or
(b) when the necessary spark advance efficiency is lower than the minimum advance efficiency value, decreasing the temporary number (Watemp) of active cylinders (3) of a number of cylinders equal to a deviation number (Δ); or
(c) when the necessary spark advance efficiency is higher than the maximum spark advance efficiency value, increasing the temporary number (Watemp) of active cylinders (3) of a number of cylinders equal to the deviation number (Δ);

in case (b) and (c) determining a necessary spark advance efficiency which should be actuated by the updated number (Watemp) of active cylinders (3) in order to guarantee the total target torque (Ci_objt) required to be delivered for the operation of the internal combustion engine (1) and updating the target number (Waobj) of active cylinders (3) until the necessary spark advance efficiency is comprised within the range defined by the possible minimum and maximum spark advance efficiency value.

2. A method according to claim 1 and comprising the further steps of:
determining a reference number (Warif) of active cylinders (3) to be controlled, in use, for the injection and the combustion as a function of the engine operation point; and
initializing the temporary number (Watemp) of active cylinders (3) to be controlled, in use, for injection and combustion as a function of the engine operation point at the reference number (Warif) of active cylinders (3).

3. A control method according to claim 1, wherein the deviation number (Δ) of cylinders (3) to be either of added to and subtracted from the combustion is equal to 2.

4. A control method according to claim 1, wherein the air mass trapped in each cylinder (3) for each engine cycle is adjusted by a VVT (Variable Valve Timing) device, which acts so as to vary the timing of at least one of the intake valves and exhaust valves.

5. A control method according to claim 1 and comprising the further steps of:
determining the position of the respective intake valves of the target number (Waobj) of active cylinders (3) to be controlled, in use, for injection and combustion, both during the intake stroke and during the exhaust stroke and as a function of the engine operation point; and
controlling the respective intake valves of the target number (Waobj) of active cylinders (3) to be controlled, in use, for injection and combustion, both during the intake stroke and during the exhaust stroke.

6. A method according to claim 1 and comprising the further step of injecting fuel into said number (Ws) of inactive cylinders (3).

* * * * *